United States Patent
Han et al.

(10) Patent No.: US 12,154,297 B2
(45) Date of Patent: Nov. 26, 2024

(54) VEHICLE AND CONTROL METHOD THEREOF

(71) Applicants: HYUNDAI MOTOR COMPANY, Seoul (KR); KIA CORPORATION, Seoul (KR)

(72) Inventors: Jihee Han, Seoul (KR); Junsik An, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/106,213

(22) Filed: Feb. 6, 2023

(65) Prior Publication Data

US 2023/0306639 A1 Sep. 28, 2023

(30) Foreign Application Priority Data

Mar. 28, 2022 (KR) .......................... 10-2022-0038042

(51) Int. Cl.
| | |
|---|---|
| *G06T 7/80* | (2017.01) |
| *G06T 7/50* | (2017.01) |
| *G07C 5/08* | (2006.01) |
| *H04N 17/00* | (2006.01) |

(52) U.S. Cl.
CPC .................. *G06T 7/80* (2017.01); *G06T 7/50* (2017.01); *G07C 5/0825* (2013.01); *G07C 5/0833* (2013.01); *H04N 17/002* (2013.01); *G06T 2207/30252* (2013.01)

(58) Field of Classification Search
CPC ... G06T 7/80; G06T 7/50; G06T 2207/30252; G07C 5/0825; G07C 5/0833; G07C 5/0808; H04N 17/002
See application file for complete search history.

(56) References Cited

U.S. PATENT DOCUMENTS

| | | | | |
|---|---|---|---|---|
| 10,026,239 | B2* | 7/2018 | Kim | G01S 7/497 |
| 10,832,502 | B2* | 11/2020 | Levinson | G05D 1/0038 |
| 11,418,693 | B2* | 8/2022 | An | G01S 15/931 |
| 11,644,350 | B2* | 5/2023 | Lau | G01D 18/008 |
| | | | | 701/29.1 |
| 2015/0317781 | A1* | 11/2015 | Napier | G06T 7/85 |
| | | | | 348/46 |
| 2017/0169627 | A1* | 6/2017 | Kim | G01S 13/862 |
| 2019/0353784 | A1* | 11/2019 | Toledano | G01S 17/86 |
| 2020/0180650 | A1* | 6/2020 | Lee | B60W 50/14 |
| 2020/0191927 | A1* | 6/2020 | Lin | G01S 17/931 |

(Continued)

*Primary Examiner* — Brian P Yenke
(74) *Attorney, Agent, or Firm* — Lempia Summerfield Katz LLC (57) ABSTRACT

A vehicle includes a first sensor provided to have a field of view facing the surroundings of the vehicle to generate image information, a second sensor including at least one of a radar sensor or a lidar sensor to generate sensing information about the surroundings of the vehicle, and a controller. The controller is configured to identify an object around the vehicle based on processing of the image information and the sensing information, identify distances between the identified surrounding object and the vehicle based on each of the image information and the sensing information, and determine whether correction of an external parameter of the first sensor is necessary based on each of the identified distances and the reference error distribution information.

17 Claims, 9 Drawing Sheets

(56) References Cited

U.S. PATENT DOCUMENTS

| | | | |
|---|---|---|---|
| 2021/0179098 A1* | 6/2021 | Lee | B60W 30/0956 |
| 2021/0197859 A1* | 7/2021 | Canady | G05D 1/0231 |
| 2021/0224617 A1* | 7/2021 | Igarashi | G01S 7/414 |
| 2021/0303898 A1* | 9/2021 | Wang | G06V 20/10 |
| 2021/0316669 A1* | 10/2021 | Wang | G01S 17/86 |
| 2022/0024485 A1* | 1/2022 | Theverapperuma | G06V 10/77 |
| 2022/0058895 A1* | 2/2022 | Han | G01S 13/931 |
| 2022/0159440 A1* | 5/2022 | Chen | H04W 4/90 |
| 2022/0194412 A1* | 6/2022 | Zhang | G06V 20/56 |
| 2022/0284627 A1* | 9/2022 | Johnson | B60W 30/143 |
| 2022/0334258 A1* | 10/2022 | Kim | G01S 13/931 |
| 2023/0061830 A1* | 3/2023 | Choi | G06V 20/70 |
| 2023/0109473 A1* | 4/2023 | Han | H04N 23/90 |
| | | | 348/135 |
| 2023/0115660 A1* | 4/2023 | Sivakumar | H04N 17/002 |
| | | | 348/187 |
| 2023/0182696 A1* | 6/2023 | Yeom | B60Q 9/00 |
| | | | 701/23 |
| 2024/0169587 A1* | 5/2024 | Han | G06T 7/80 |

* cited by examiner

VEHICLE AND CONTROL METHOD THEREOF

CROSS-REFERENCE TO RELATED APPLICATION

This application is based on and claims priority under 35 U.S.C. § 119 to Korean Patent Application No. 10-2022-0038042, filed on Mar. 28, 2022 in the Korean Intellectual Property Office, the disclosure of which is incorporated by reference herein in its entirety.

BACKGROUND

1. Field

The disclosure relates to a vehicle and a control method thereof, and more particularly, to a vehicle and a control method thereof capable of determining a shift or change of position of a camera and correcting an external parameter of the camera.

2. Description of the Related Art

As interest in autonomous vehicles has increased, research on sensors mounted on autonomous vehicles is being actively conducted. Sensors mounted on autonomous vehicles include an image sensor, an infrared sensor, a radar, a GPS, a lidar, and a gyroscope. Among them, the image sensor occupies an important position as a sensor that replaces the human eye.

For image processing, a controller included in a vehicle may receive an image obtained through a camera and an ultrasonic sensor value as inputs and may output a recognition result. In other words, the controller included in the vehicle classifies a position and type of an object of interest through deep learning from the camera image and estimates a distance between the object of interest and the vehicle based on an image recognition post-processing technology (camera calibration, etc.).

In a calibration-based object distance estimation, coordinates in an image are converted into a real distance between a vehicle and an object of interest by using external and internal parameters of a camera. In this case, when the external parameters of the camera are changed by a shift or change of position of a camera or the like due to shock or shaking while the vehicle is driving, an error may occur in a distance value regardless of the output performance through deep learning.

In addition, according to a conventional external parameter correction method, when a camera is shifted, there is an inconvenience in that a person has to put the camera at a specific position and manually perform a new calibration operation.

SUMMARY

It is an aspect of the disclosure to provide a vehicle and a control method of a vehicle capable of determining the need for correction of an external parameter of an image sensor depending on a shift or change of position of a camera and performing correction of the external parameter.

Additional aspects of the disclosure are set forth in part in the description which follows and, in part, should be apparent from the description. Some additional aspects of the disclosure may be learned by practice of the disclosure.

In accordance with an aspect of the disclosure, a vehicle includes: a first sensor provided to have a field of view facing surroundings of the vehicle to generate image information; a second sensor including at least one of a radar sensor or a lidar sensor configured to generate sensing information about the surroundings of the vehicle; and a controller including a processor and a memory. The processor is configured to process the image information and the sensing information, and the memory is configured to store reference error distribution information. The controller is configured to identify an object around the vehicle based on processing of the image information and the sensing information, identify distances between the identified surrounding object and the vehicle based on each of the image information and the sensing information, and determine whether correction of an external parameter of the first sensor is necessary based on each of the identified distances and the reference error distribution information.

The controller may identify the distances between the surrounding object and the vehicle in response to one object being identified in the surroundings of the vehicle.

The controller may determine that correction of the external parameter of the first sensor is necessary when an error between the identified respective distances exists outside a predetermined interval of the reference error distribution information.

The controller may generate distance error distribution information based on an error between the identified respective distances in response to identifying each of the distances between the surrounding object and the vehicle based on each of the image information and the sensing information.

The controller may determine that correction of the external parameter of the first sensor is necessary when an average of the generated distance error distribution information exists outside a predetermined interval of the reference error distribution information.

The controller may generate a signal for controlling at least one of an audio device or a display device to output a warning message in response to determining that correction of the external parameter of the first sensor is necessary.

The memory may be further configured to store a corrected external parameter of the first sensor for each case, and the controller may update the external parameter of the first sensor based on the corrected external parameter in response to determining that correction of the external parameter of the first sensor is necessary.

The controller may update the first sensor with the corrected external parameter including an error between the distances identified based on processing each of the image information and the sensing information within a predetermined interval of the reference error distribution information among the corrected external parameters for each case.

The controller may generate a signal for controlling at least one of an audio device or a display device to output a warning message in response to a case in which there is no corrected external parameter including an error between the distances identified based on processing each of the image information and the sensing information within a predetermined interval of the reference error distribution information among the corrected external parameters for each case.

The controller may determine that correction of the external parameter of the first sensor is necessary when a difference between a variance of the generated error distribution information and a variance of the reference error distribution information is greater than or equal to a predetermined value.

In accordance with an aspect of the disclosure, a vehicle control method includes: generating image information about surroundings of a vehicle; generating sensing information about the surroundings of the vehicle; identifying an object around the vehicle based on processing of the image information and the sensing information; identifying distances between the identified object and the vehicle based on each of the image information and the sensing information; and determining whether correction of an external parameter of an image sensor is necessary based on each of the identified distances and reference error distribution information.

BRIEF DESCRIPTION OF THE DRAWINGS

These and/or other aspects of the present disclosure should be apparent and more readily appreciated from the following description of the embodiments, taken in conjunction with the accompanying drawings of which.

DETAILED DESCRIPTION

Throughout the specification, like reference numerals refer to like elements. This specification does not describe all aspects of the disclosed embodiments, and duplicative contents or descriptions between the general contents of the disclosure or the descriptions of embodiments in the technical field of the disclosure have been omitted. The terms 'member,' 'module,' 'device,' and the like used in this specification may be embodied as software or hardware. It is also possible for a plurality of 'members,' 'modules,' and 'devices' to be embodied as one component, or one 'member,' 'module,' and 'device' to include a plurality of components according to the embodiments.

Throughout the specification, when a part is referred to as being "connected" to another part, it includes not only a direct connection but also an indirect connection. The indirect connection includes connecting or connection through a wireless network.

Also, when it is described that a part "includes" an element, it means that the element may further include other or additional elements. The term "includes" does not exclude the presence of other elements unless specifically stated otherwise.

The terms 'first,' 'second,' etc. are used to distinguish one element from another element, and the elements are not limited by the above-mentioned terms.

The singular forms "a," "an," and "the" include plural referents unless the context clearly dictates otherwise.

In each step, an identification numeral is used for convenience of explanation. The identification numeral does not describe the order of the steps and each step may be performed in a different order from the order specified unless the context clearly states a particular order. When a component, device, element, or the like of the present disclosure is described as having a purpose or performing an operation, function, or the like, the component, device, or element should be considered herein as being "configured to" meet that purpose or perform that operation or function.

A vehicle 10 according to an embodiment of the disclosure refers to a transportation means capable of traveling on a road or track. Hereinafter, for convenience of description, the vehicle 10 is described using a four-wheeled vehicle as an example. However, the embodiment of the vehicle 10 is not limited thereto.

The vehicle 10 may include a vehicle body including an outer part of the vehicle 10 and a skeleton for loading people and/or cargo, such as for example, an engine compartment, a trunk, a bumper, a roof, a side plate, a floor, and the like. The vehicle 10 may further include a chassis including essential devices necessary for the vehicle 10 to travel, such as for example, an engine, a power transmission device, a steering device, a brake, and the like.

A general description of the vehicle body and chassis of the vehicle 10 has been omitted.

Hereinafter, the operation principle and embodiments of the disclosure are described with reference to the accompanying drawings.

Figure 1:
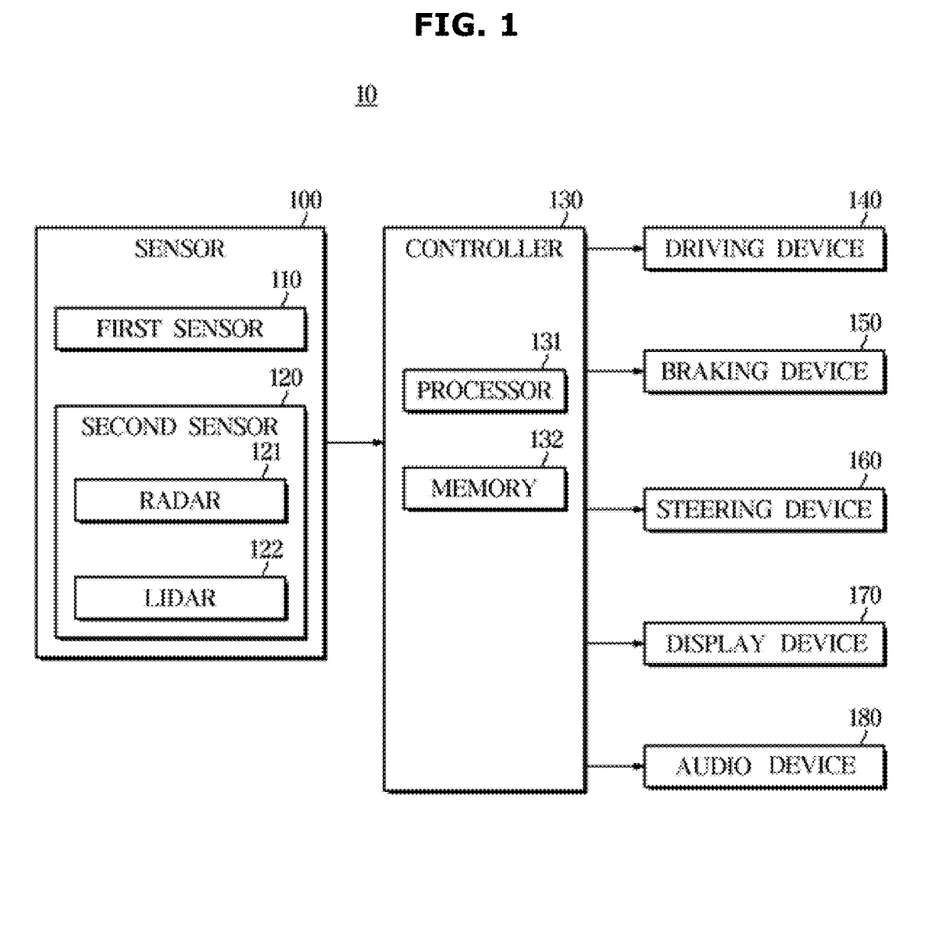
FIG. 1 is a block diagram for explaining a configuration of a vehicle according to an embodiment.

FIG. 1 is a block diagram for explaining a configuration of a vehicle according to an embodiment.

Referring to FIG. 1, the vehicle 10 includes a sensor 100, a controller 130, a driving device 140, a braking device 150, a steering device 160, a display device 170, and an audio device 180.

The sensor 100 may include a first sensor 110 and a second sensor 120. More specifically, the first sensor 110 may refer to, for example, an image sensor, and the second sensor 120 may include, for example, a radar 121 and/or a lidar 122 sensor.

The first sensor 110 may include at least one image sensor, and the second sensor 120 may include the at least one radar 121 and/or lidar 122 sensor. In other words, the number of the first sensors 110 and the second sensors 120 is not limited.

Figure 2:
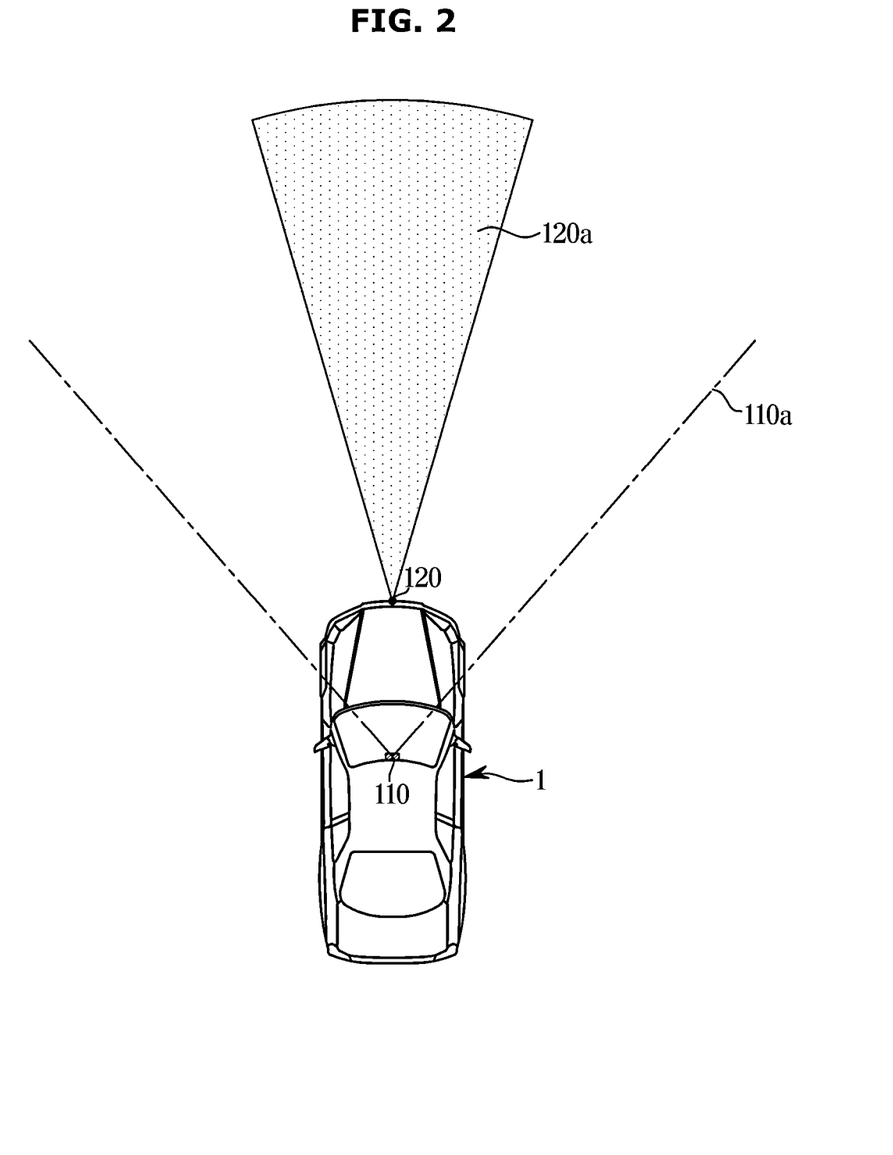
FIG. 2 is a conceptual diagram for explaining fields of views of a first sensor and a second sensor of the vehicle according to an embodiment.

FIG. 2 is a conceptual diagram for explaining fields of view of the first sensor and the second sensor of the vehicle according to an embodiment.

The first sensor 110 may have a field of view 110a facing the front of the vehicle 10 as illustrated in FIG. 2. The first sensor 110 may be, for example, installed on a front windshield of the vehicle 10, but the installation position of the first sensor 110 is not limited thereto. As the first sensor 110 includes the at least one image sensor, the first sensor 110 may be disposed to have a field of view facing the surroundings of the vehicle 10. FIG. 2 illustrates, for example, a single first sensor 110 and a single second sensor 120, but the present disclosure is not limited thereto. A plurality of first sensors 110 and/or second sensors 120 may be provided to each have a field of view facing the surroundings of the vehicle 10.

The first sensor 110 may include a plurality of photodiodes for converting light into an electrical signal. The plurality of photodiodes may be arranged in a two-dimensional matrix. The first sensor 110 may generate image information including, for example, a two-dimensional image and generate image information including a plurality of two-dimensional images arranged over time.

The first sensor 110 may photograph the surroundings of the vehicle 10 and obtain image information around the vehicle 10. The image information around the vehicle 10 may include information about other vehicles, pedestrians, cyclists, and/or lanes located around the vehicle 10.

The first sensor 110 may be electrically connected to the controller 130. For example, the first sensor 110 may be connected to the controller 130 through a vehicle communication network NT or may be connected to the controller 130 through a hard wire. Accordingly, the first sensor 110 may transmit image information about the surroundings of the vehicle 10 to the controller 130.

The second sensor 120 may have a field of sensing 120a facing the front of the vehicle 10 as illustrated in FIG. 2. The second sensor 120 may be installed, for example, on a grille or a bumper of the vehicle 10. However, the disclosure is not limited thereto. It should be understood that the second sensor 120 may include the at least one radar 121 and/or lidar 122, and thus the at least one radar 121 and/or lidar 122 may each be disposed to have a field of sensing facing the surroundings of the vehicle 10.

More specifically, the second sensor 120 may include the radar 121 and the lidar 122.

The radar 121 may include a transmission antenna (or a transmission antenna array) to radiate a transmission wave toward the front of the vehicle 10 and a reception antenna (or a reception antenna array) to receive a reflection wave reflected from an object. The radar 121 may obtain sensing information from a transmission wave transmitted by the transmission antenna and a reflection wave received by the reception antenna. The sensing information may include a relative position and a relative speed of another vehicle, a pedestrian, or a cyclist located around the vehicle 10. The radar 121 may calculate a relative distance to the object based on a phase difference (or time difference) between the transmission wave and the reflection wave and calculate a relative speed of the object based on a frequency difference between the transmission wave and the reflection wave.

The lidar 122 may have, for example, a field of view facing all directions of the surroundings of the vehicle 10. The lidar 122 may be installed, for example, on the roof of the vehicle 10. However, the disclosure is not limited thereto.

The lidar 122 may include a light source (e.g., a light emitting diode or a light emitting diode array, or a laser diode or a laser diode array) to emit light (e.g., an infrared ray), and a light receiver (e.g., a photodiode or photodiode array) to receive light reflected from an object. In addition, as needed, the lidar 122 may further include a driving device to rotate the light source and the light receiver. While rotating, the lidar 122 may receive sensing information by emitting light and receiving light reflected from the object. The sensing information may include a relative position and a relative speed of another vehicle, a pedestrian, or a cyclist in the surroundings of the vehicle 10.

The radar 121 and/or the lidar 122 may be connected to the controller 130 through, for example, the vehicle communication network NT, a hard wire, or a printed circuit board. Accordingly, the second sensor 120 may transmit sensing information to the controller 130.

At least one of the first sensor 110 and the second sensor 120 and the controller 130 may integrally assist driving of the vehicle 10. For example, the first sensor 110, the second sensor 120, and the controller 130 may integrally provide lane departure warning (LDW), lane keeping assist (LKA), high beam assist (HBA), automatic emergency braking (AEB), traffic sign recognition (TSR), adaptive cruise control (ACC), blind spot detection (BSD), and the like. However, the disclosure is not limited thereto.

The controller 130 may include a processor 131 and a memory 132.

The controller 130 may be electrically interconnected with the components, i.e., the first sensor 110, the second sensor 120, the driving device 140, the braking device 150, the steering device 160, the display device 170, and the audio device 180 of the vehicle 10. For example, the controller 130 may be a micro control unit (MCU) itself of the vehicle 10, may be connected to the MCU through the vehicle communication network NT, or may be connected through a hard wire. Herein, to be electrically interconnected may refer to a state in which mutual data communication is possible or power transmission/reception is possible.

More specifically, the processor 131 may process image information and sensing information, and may output a driving signal, a braking signal, a steering signal, and a warning signal for controlling the driving device 140, the braking device 150, the steering device 160, the display device 170, and the audio device 180. For example, the processor 131 may include an image processor, a digital signal processor (DSP), and/or a micro control unit (MCU).

The processor 131 may process the image information obtained from the first sensor 110 and/or the sensing information obtained from the second sensor 120. Accordingly, the processor 131 may identify an object around the vehicle 10 based on processing of the image information and/or the sensing information.

More specifically, in order to identify an object around the vehicle 10, the processor 131 may input the image information obtained from the first sensor 110 into a surrounding object recognition model to output the type and/or position of the object around the vehicle 10. In addition, the processor 131 may perform a deep-learning algorithm for learning the surrounding object recognition model. Accordingly, the memory 132 may store the deep-learning algorithm. However, the disclosure is not limited thereto, and a conventionally known machine learning algorithm or a machine learning algorithm to be developed in the future, including unsupervised learning, reinforcement learning, and supervised learning, may be applied.

For example, the surrounding object recognition model may refer to a previously learned surrounding object recognition model stored in the memory 132.

The surrounding object recognition model may refer to a machine learning model trained such that image information obtained by photographing the surroundings of the vehicle 10 is input to the surrounding object recognition model to output an object around the vehicle 10. More specifically, the processor 131 may output at least one pixel (coordinates) associated with an object present in image information by inputting the image information obtained from the first sensor 110 into the surrounding object recognition model.

Herein, the object may include, for example, a vehicle other than the vehicle 10, a pedestrian, a cyclist, and/or an object larger than a predetermined size. However, the type of object is not limited thereto.

As is described in detail below, the processor 131 may calculate distance value data between a point corresponding to a pixel of the image information and the vehicle 10 based on the processing of the image information. In other words, the distance value data may be metadata including a distance value corresponding to each pixel of the image information generated by each of the first sensors 110. More specifically, the distance value data may include information about a longitudinal position and a lateral position with respect to the first sensor 110 (or the vehicle 10) corresponding to each pixel.

Accordingly, when the vehicle 10 includes a plurality of the first sensors 110, the processor 131 may calculate distance value data between a point corresponding to a pixel of each image information and the vehicle 10 (image sensor) based on the processing of the image information obtained from each of the first sensors 110. As another embodiment, the distance value data may be data previously stored in the memory 132.

The processor 131 may identify a distance between the identified object around the vehicle 10 and the vehicle 10 based on at least one pixel and distance value data for a position of the output surrounding object by inputting the image information into the surrounding object recognition model.

Also, the processor 131 may identify a distance between the identified object around the vehicle 10 and the vehicle 10 based on the processing of the sensing information obtained from the second sensor 120.

In this case, the processor 131 may identify an object around the vehicle 10 included in the image information based on the processing of the image information obtained from the first sensor 110. The processor 131 may also identify a distance between the vehicle 10 and the surrounding object based on pixel information and distance value data corresponding to a position of the identified object.

Also, the processor 131 may match, through a greedy algorithm, an object around the vehicle 10 identified based on the processing of the image information obtained from the first sensor 110 and an object around the vehicle 10 identified based on the processing of the sensing information obtained from the second sensor 120. Accordingly, the processor 131 may identify a correlation between a distance between the object identified based on the processing of the image information obtained from the first sensor 110 and the vehicle 10, and a distance between the object identified based on the processing of the sensing information obtained from the second sensor 120 and the vehicle 10. The processor 131 is not limited to the greedy algorithm. For example, a conventionally known algorithm and/or an algorithm to be developed in the future may be applied to the processor 131. In other words, an algorithm capable of determining the identity and/or correlation between the surrounding objects identified based on each of the image information obtained from the first sensor 110 and the sensing information obtained from the second sensor 120 may be applied to the processor 131.

In other words, in this case, the processor 131 may identify a surrounding object identified based on the processing of the image information obtained from the first sensor 110 and a surrounding object identified based on the processing of the sensing information obtained from the second sensor 120, as the same object.

Accordingly, the processor 131 may identify distances between the identified surrounding object and the vehicle 10 based on processing of each of the image information and the sensing information. In other words, the processor 131 may identify the distance between the vehicle 10 and the identified object around the vehicle 10 as a distance value identified by processing only the image information and a distance value identified by processing only the sensing information.

In this case, as described in detail below, the processor 131 may determine whether an external parameter correction of the first sensor 110 is necessary based on a distance identified based on processing of image information for the same object around the vehicle 10, each distance identified based on processing of sensing information, and reference error distribution information.

The memory 132 may store a reception from the sensor 100, a processing result of the processor 131, a preset value and/or a variety of information (e.g., distance value data of each of the first sensors 110 disposed in the vehicle 10), and the like. Necessary information among the information received from the sensors 100 is stored in the memory 132 and may be stored in the form of a database.

The memory 132 may store a program for performing the above-described operation and an operation described hereinafter, and the processor 131 may execute the stored program. When a plurality of the memories 132 and processors 131 are provided, they may be integrated into one chip or may be provided in physically separate locations. The memory 132 may include a volatile memory for temporarily storing data, such as a static random access memory (S-RAM) and a dynamic random access memory (DRAM). Also, the memory 132 may include a non-volatile memory for long-term storage of a control program and control data, such as a read only memory (ROM), an erasable programmable read only memory (EPROM), and an electrically erasable programmable read only memory (EEPROM). The processor 131 may include various logic circuits and arithmetic circuits, process data according to a program provided from the memory 132 and generate a control signal depending on a processing result.

Although the real world consists of three dimensions, when it is photographed with the first sensor 110, it is projected as a two-dimensional image. In this case, actual three-dimensional position coordinates are determined by a position and direction of the first sensor 110 at the time of taking the image and geometrically calculating where the first sensor 110 is located on the image. However, because an actual image is affected by an internal factor such as the lens used and a distance to the object, three-dimensional position coordinates may be accurately calculated only by removing the internal factor when a position projected on the image is obtained or when three-dimensional spatial coordinates are inversely restored from image coordinates. A process of obtaining a parameter value of such an internal factor is called camera calibration.

The camera calibration is largely divided into an internal parameter calibration process of identifying mechanical characteristics of the first sensor 110 itself, and an external parameter calibration process of identifying external characteristics of the device, such as an installation position and attitude information (direction angle) of the first sensor 110. The internal parameters of the first sensor 110 include a focal length, a principal point, a lens distortion coefficient, and the like. The external parameters of the first sensor 110 include three-dimensional position information (installation position of the first sensor 110 such as x, y, z, etc.) of the first sensor 110 based on a reference coordinate system (world coordinate system) and attitude information (direction angle such as pan, tilt, roll, etc.). Because the camera calibration is a known technique, a detailed description thereof has been omitted.

Figure 3:
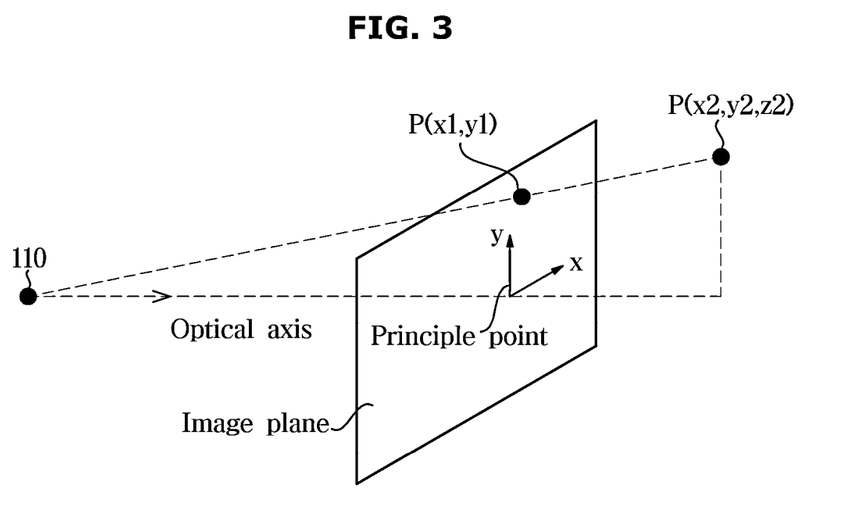
FIG. 3 is a conceptual diagram for explaining distance calculation through camera calibration according to an embodiment.

FIG. 3 is a conceptual diagram for explaining distance calculation through camera calibration according to an embodiment.

Referring to FIG. 3, a distance value z2 between an object (x2, y2, z2) on the ground corresponding to a pixel (x1, y1) and the first sensor 110 may be calculated based on a distance between the pixel (x1, y1) and a principal point on an image plane and an optical axis of the first sensor 110. Herein, the object on the ground may be, for example, a single point. In the case of an object having a volume, it may mean a point in contact with the ground.

More specifically, because the object on the ground corresponds to the pixel (x1, y1) on the image plane, a ratio between a normalized distance between the first sensor 110 and the principal point and a distance between the principal point and the pixel (x1, y1) is equal to a ratio between a distance between the first sensor 110 and the optical axis corresponding to the object on the ground and a distance between the optical axis and the object on the ground. In addition, because the object exists on the ground and a distance between the ground and the first sensor 110 may be obtained based on camera calibration, a distance value between the object (x2, y2, z2) corresponding to the pixel (x1, y1) and the first sensor 110 may be calculated. However, the disclosure is not limited thereto. Because a method of calculating a distance value between an image sensor and an object corresponding to a pixel on an image plane based on camera calibration is a known technique, a detailed description thereof has been omitted below.

Figure 4:
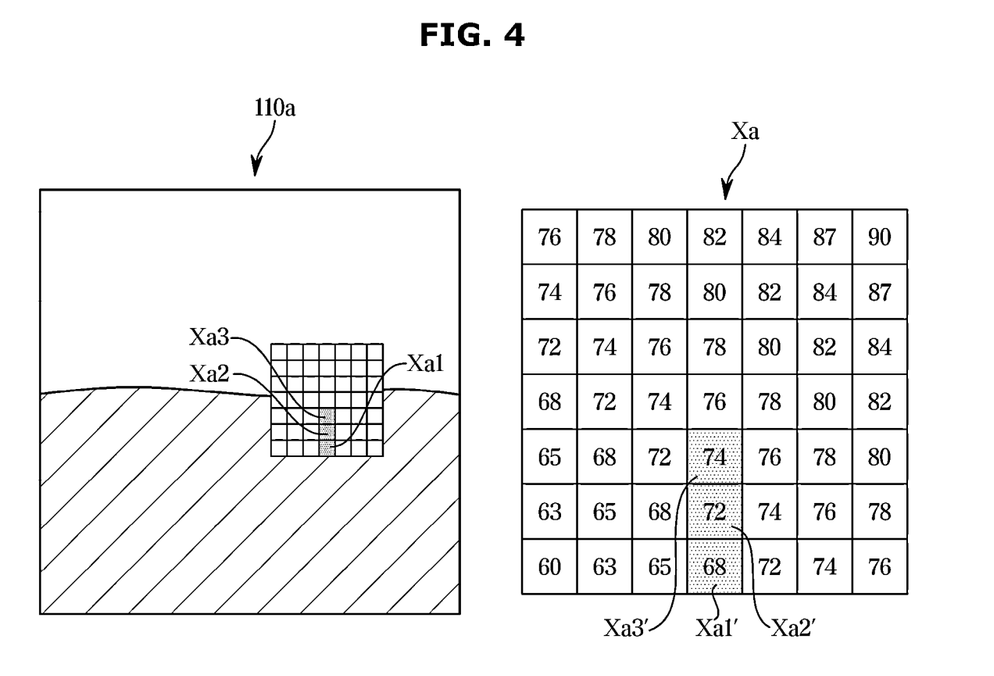
FIG. 4 is a conceptual diagram for explaining distance value data according to an embodiment.

Hereinafter, distance value data is described with reference to FIG. 4. FIG. 4 illustrates a conceptual diagram based on image information obtained based on the one first sensor 110 for convenience of description, but is not limited thereto. In other words, FIG. 4 may be a conceptual diagram of data applicable to each of image sensors depending on the number of the image sensors included in the first sensor 110.

FIG. 4 is a conceptual diagram for explaining distance value data according to an embodiment.

Referring to FIG. 4, an image plane corresponding to the field of view 110a of the one first sensor 110 and distance value data Xa (i.e., Xa1', Xa2', Xa3' . . . ) corresponding thereto is illustrated. In other words, each of pixels (Xa1, Xa2, Xa3 . . . ) identified based on distances between the pixels (Xa1, Xa2, Xa3 . . . ) of the image plane and the principal point and the optical axis of the first sensor 110 may refer to distance value data (Xa1', Xa2', Xa3' . . . ) corresponding thereto.

In other words, the distance value data may be metadata about a distance value from the first sensor 110 corresponding to each pixel of an image plane generated through camera calibration using the image information generated by the first sensor 110.

Referring to FIG. 4, the distance value data may include the distance value data (Xa1', Xa2', Xa3' . . . ) corresponding to the pixels (Xa1, Xa2, Xa3 . . . ), respectively. Accordingly, the one first sensor 110 may pre-store distance value data including metadata about a distance value corresponding to each pixel or the distance value data may be pre-stored in the memory 132. However, the disclosure is not limited thereto. As another embodiment, the distance value data may be data calculated based on the controller 130 processing the image information received from the first sensor 110.

In other words, as illustrated in FIG. 4, the controller 130 may identify a distance value corresponding to a pixel on an image plane of the image information through camera calibration and generate distance value data, based on the processing of at least one piece of the image information obtained from the first sensor 110.

However, the disclosure is not limited thereto.

As illustrated in FIG. 4, the distance value data Xa (i.e., Xa1', Xa2', Xa3' . . . ) expresses only one numerical value (distance) corresponding to a pixel, but is not limited thereto, and as another embodiment, may further include information about the longitudinal and lateral positions which correspond to the pixel with respect to the vehicle 10 and/or the first sensor 110.

An error or difference may occur in an actual distance between the vehicle 10 and an object around the vehicle 10 and an identified distance between the vehicle 10 and an object around the vehicle 10, because when an external parameter of the first sensor 110 is changed, the processor 131 generates distance value data based on the existing or unchanged external parameter. When a distance is identified (estimated) based on image information while the vehicle 10 is driving, a confidence level for a distance value of a recognized object may decrease due to this error. A vehicle and a vehicle control method according to an embodiment of the disclosure may be intended to solve the above problem. However, the disclosure is not limited thereto.

Figure 5:
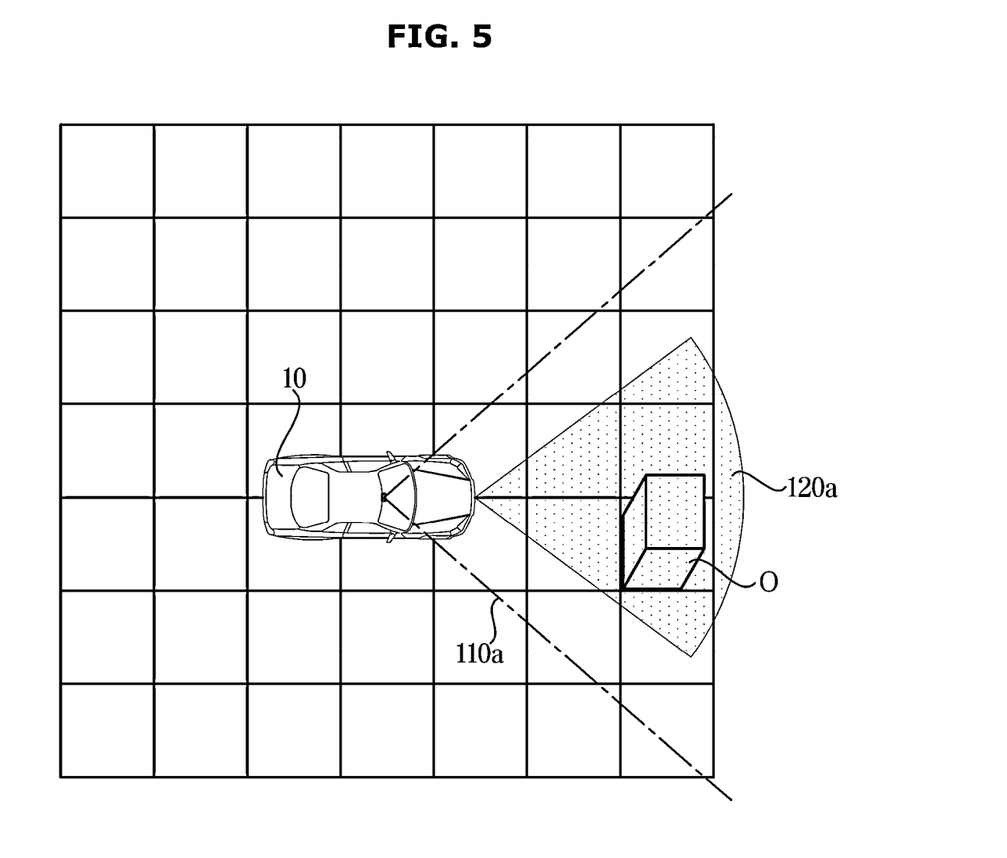
FIG. 5 is a conceptual diagram for explaining reference error distribution information according to an embodiment.

FIG. 5 is a conceptual diagram for explaining reference error distribution information according to an embodiment.

Referring to FIG. 5, the reference error distribution information may be data generated in a reference step after a manufacturing process of the vehicle 10. In other words, the reference error distribution information may be information obtained in a situation in which the internal parameters and/or external parameters of the first sensor 110 of the vehicle 10 are not changed. For example, when the reference error distribution information of the first sensor 110 is generated, a vertical object O may be constructed for each predetermined section or arbitrary location in the field of view 110a of the first sensor 110 and the field of view 120a of the second sensor 120 of the vehicle 10.

Accordingly, the controller 130 may identify a pixel at a contact point between the vertical object O and the ground based on the processing of the image information obtained from the first sensor 110, and identify a distance between the vertical object O and the vehicle 10 based on the identified pixel and the distance value data obtained through camera calibration as described above. Also, the controller 130 may identify a distance between the vertical object O and the vehicle 10 based on the processing of the sensing information obtained from the second sensor 120. In this case, the controller 130 may identify an error value between the distance value identified based on the processing of the image information and the distance value identified based on the processing of the sensing information.

Therefore, based on the vertical object O that may be provided in various positions, the controller 130 may generate reference error distribution information by accumulating an error between the distance between the vertical object O and the vehicle 10 obtained based on the image information and the distance between the vertical object O and the vehicle 10 obtained based on the sensing information.

Figure 6:
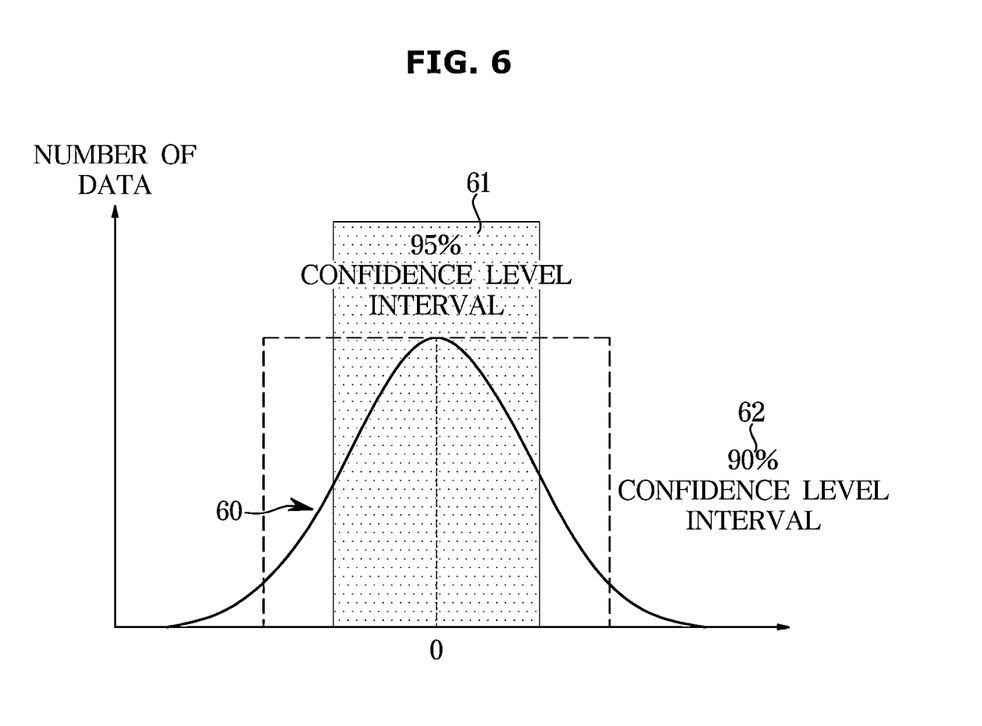
FIG. 6 is a conceptual diagram for explaining a confidence interval of the reference error distribution information according to an embodiment.

FIG. 6 is a conceptual diagram for explaining a confidence interval of the reference error distribution information according to an embodiment.

Referring to FIG. 6, as described above, the controller 130 may generate reference error distribution information 60 by accumulating the error between the distance between the vehicle 10 and the vertical object O identified based on the processing of the image information and the distance between the vehicle 10 and the vertical object O identified based on the processing of the sensing information. Because the reference error distribution information 60 is information obtained in a situation in which the internal parameters and/or external parameters of the first sensor 110 of the vehicle 10 are not changed, an average of the respective error values may converge to zero.

The controller 130 may determine whether correction of the external parameter of the first sensor 110 is necessary, based on a distance error between the sensors 110 and 120 for the same object obtained based on the processing of the above-described reference error distribution information 60, the image information obtained from the first sensor 110, and the sensing information obtained from the second sensor 120.

More specifically, when an error value of the distance between the object and the vehicle 10 identified based on the processing of the image information and the distance between the object and the vehicle 10 identified based on the processing of the sensing information exists outside a predetermined interval of the reference error distribution information 60, the controller 130 may identify that correction of the external parameter of the first sensor 110 is necessary.

Herein, the predetermined interval may refer to a confidence interval of the reference error distribution information 60 as illustrated in FIG. 6. For example, a 95% confidence level interval 61 or a 90% confidence level interval 62 may be applied to the predetermined interval. However, the disclosure is not limited thereto. As another embodiment, it may be understood that various confidence level intervals may be applied. In addition, it may be understood that a driver and/or a user may adjust a range of the interval depending on a required correction sensitivity of the first sensor 110. In this case, it may be understood that the driver may increase a calibration frequency and/or sensitivity (accuracy) of the first sensor 110 by increasing a range of the confidence level interval.

Figure 7:
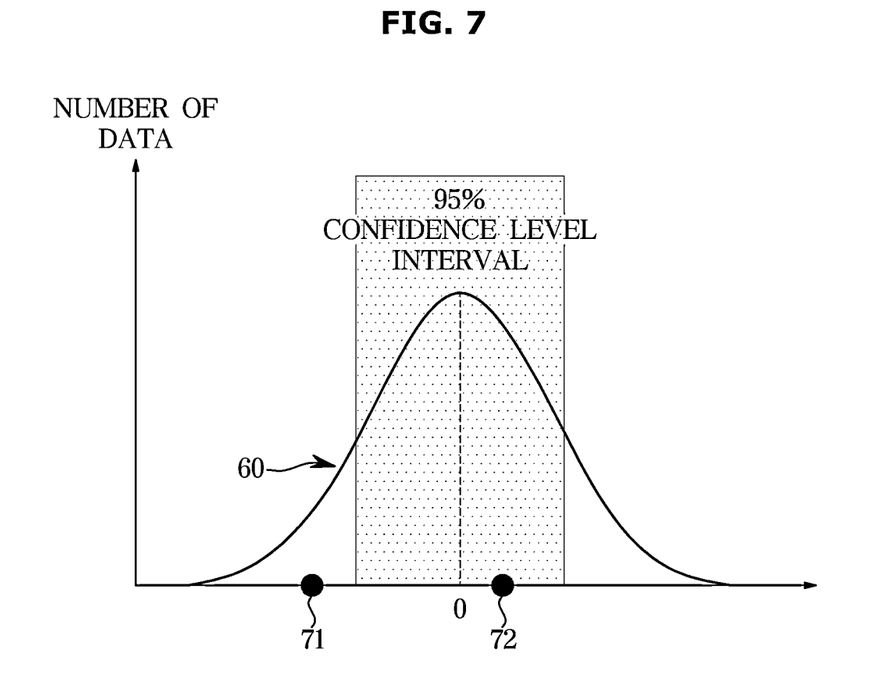
FIG. 7 is a conceptual diagram for explaining a determination of whether the vehicle needs to correct an external parameter of the first sensor according to an embodiment.

FIG. 7 is a conceptual diagram for explaining a determination of whether the vehicle 10 needs to correct an external parameter of the first sensor 110 according to an embodiment. Hereinafter, for convenience of explanation, the predetermined interval is described as corresponding to the 95% confidence level section 61. In other words, it may be understood that the predetermined section may be changed as described above.

Referring to FIG. 7, based on the processing of the image information obtained from the first sensor 110 and the sensing information obtained from the second sensor 120, the controller 130 may identify distances between the vehicle 10 and the same object around the vehicle 10 based on the respective pieces of information and identity an error between the distances. Accordingly, when an error 71 between the distances exists outside the predetermined interval, the controller 130 may determine that correction of the external parameter of the first sensor 110 is necessary.

In another case, when an error 72 between the identified distances exists within the predetermined interval, the controller 130 may determine that external parameter correction of the first sensor 110 is not necessary.

More specifically, because the error between the distance between the vehicle 10 and the object around the vehicle 10 obtained based on the processing of image the information and the distance between the vehicle 10 and the object around the vehicle 10 obtained based on the processing of the sensing information is an error generated depending on a change in the external parameter of the first sensor 110, the controller 130 may identity a change in the position of the first sensor 110 of the vehicle 10 based on a size of the error and the reference error distribution information.

In response to the controller 130 determining that the external parameter correction of the first sensor 110 is necessary, the controller 130 may generate a signal for controlling at least one of the display device 170 and the audio device 180 to output a warning message. The warning message may refer to, for example, a message warning of a shift in the position and/or direction angle of the first sensor 110 (e.g., an image sensor or a camera) in the vehicle 10.

Figure 8:
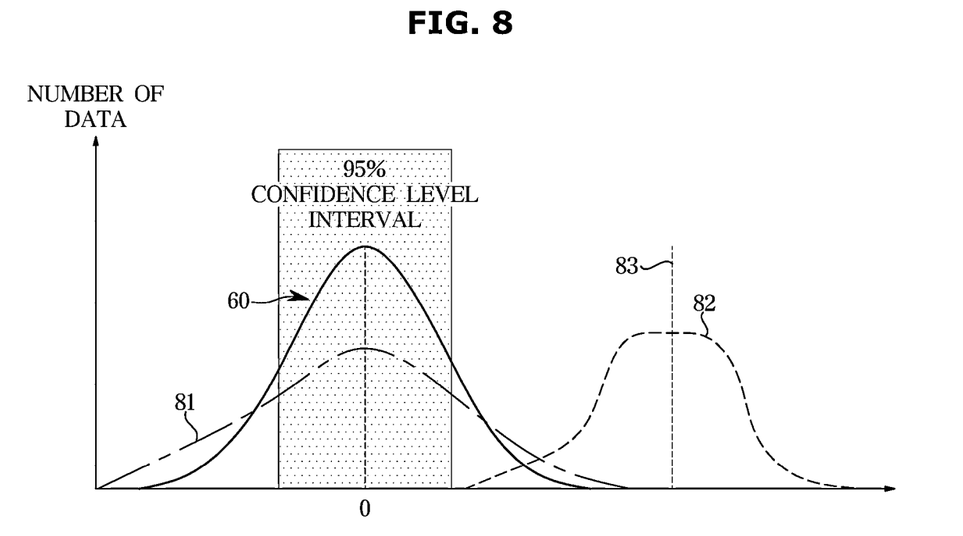
FIG. 8 is a conceptual diagram for explaining a determination of whether the vehicle needs to correct the external parameter of the first sensor according to an embodiment.

FIG. 8 is a conceptual diagram for explaining a determination of whether the vehicle 10 needs to correct the external parameter of the first sensor 110 according to an embodiment.

Referring to FIG. 8, the controller 130 may identify an object around the vehicle 10 based on each of the image information obtained from the first sensor 110 and the sensing information obtained from the second sensor 120 and may generate distance error distribution information 81 and 82 between the first sensor 110 and the second sensor 120 based on an error between the respective distances in response to identifying each of the distances between the object and the vehicle 10.

The controller 130 may accumulate data in a specific situation in order to generate the distance error distribution information 81 and 82. However, the disclosure is not limited thereto. For example, as described above with respect to FIG. 7, the controller 130 may determine whether correction of the external parameter of the first sensor 110 is necessary in a specific situation described below in order to secure the errors 71 and 72 of the distance value.

More specifically, the controller 130 may determine an optimal environment (specific situation) for determining the need to correct the external parameter of the first sensor 110 when the vehicle 10 is driving. More specifically, the controller 130 may identify the location and/or type of an object around the vehicle 10 included in image information by inputting the image information obtained from the first sensor 110 while the vehicle 10 is driving into the surrounding object recognition model. In this case, in response to one object being identified in the surroundings of the vehicle 10, the controller 130 may identify and accumulate each of the distances between the object and the vehicle 10 based on each of the image information and the sensing information, with respect to the object, thereby generating distance error distribution information.

This means a case in which because a single object exists in the field of view 110a of the first sensor 110, noise of the image information-based distance estimation is minimized and the sensitivity of the second sensor 120 is lowered. Thus, the accuracy of each of distance values obtained based on each of the image information and the sensing information may increase. Accordingly, the controller 130 may more accurately determine whether correction of the external parameter of the first sensor 110 is necessary. However, the disclosure is not limited thereto.

As another embodiment, the above-described optimal environment (specific situation) may mean a case in which the number of surrounding objects identified based on the image information obtained from the first sensor 110 and the number of surrounding objects identified based on the sensing information obtained from the second sensor 120 are the same. Also, as another embodiment, the specific situation may mean a case in which an object within the predetermined distance is recognized or an object having a size greater than or equal to the predetermined size is recognized.

The controller 130 may determine whether correction of the external parameter of the first sensor 110 is necessary based on the obtained distance error distribution information 81 and 82 and the obtained reference error distribution information 60.

More specifically, the controller 130 may identify a variance of the distance error distribution information 81 and a variance of the reference error distribution information 60 based on the processing of the obtained distance error distribution information 81 and the obtained reference error distribution information 60, respectively. Accordingly, in response to a case in which the difference between the variance of the distance error distribution information 81 and the variance of the reference error distribution information 60 is greater than or equal to a predetermined value, the controller 130 may determine that correction of the external parameter of the first sensor 110 is necessary. This may mean that the external parameter of the first sensor 110 is changed because, when the variance of the distance error distribution information 81 is greater than the variance of the reference error distribution information 60 by a predetermined value or more, values with an error between a distance value to an object obtained based on the image information obtained from the first sensor 110 and a distance value to an object obtained based on sensing information obtained from the second sensor 120 is increased compared to the reference error distribution information 60.

The controller 130 may calculate an average value 83 of the distance error distribution information 82 based on the processing of the obtained distance error distribution information 82 and the obtained reference error distribution information 60. Accordingly, in response to a case in which a difference between the average value 83 of the distance error distribution information 82 and an average value (e.g., zero) of the reference error distribution information 60 is greater than a predetermined value, the controller 130 may determine that correction of the external parameter of the first sensor 110 is necessary.

However, the disclosure is not limited thereto. As another embodiment, the controller 130 may determine whether correction of the external parameter of the first sensor 110 is necessary in consideration of both the variance and the average of the obtained distance error distribution information.

The memory 132 may further store a corrected external parameter for each case of the first sensor 110. In other words, the memory 132 may further store an external parameter of the first sensor 110 corresponding to each situation depending on a situation in which the first sensor 110 is frequently shifted due to shaking and/or impact of the vehicle 10 while driving. There is not limited in the number of corrected external parameters for each case.

In this case, based on the processing of the image information and the sensing information, in response to the need to correct the external parameter of the first sensor 110, the controller 130 may update the external parameter of the first sensor 110 based on the corrected external parameter for each case stored in the memory 132.

More specifically, in response to determining that correction of the external parameter of the first sensor 110 is necessary, the controller 130 may apply the corrected external parameters for each case stored in the memory 132 to the first sensor 110, respectively. In this case, the controller 130 may determine whether correction of the external parameter of the first sensor 110 is necessary and may update the external parameter applied to the first sensor 110 in response to determining that correction of the external parameter of the first sensor 110 is necessary. In other words, in a case where there are corrected external parameters including an error between the distances identified based on processing each of the image information and the sensing information within a predetermined interval of the reference error distribution information 60 among the corrected external parameters for each case, the controller 130 may update the first sensor 110 with the corresponding corrected external parameter. However, the disclosure is not limited thereto.

Herein, the update may, for example, ensure that distance value data generated based on the updated external parameter is used in future distance estimation (identification) of an object around the vehicle 10 through the first sensor 110 by changing the external parameter of the first sensor 110 to the corrected external parameter.

On the other hand, in response to a case where there is no corrected external parameter including an error between the distances identified based on processing each of the image information and the sensing information within the predetermined interval of the reference error distribution information 60 among the corrected external parameters for each case, the controller 130 may generate a signal for controlling at least one of the audio device and the display device to output a warning message. However, the disclosure is not limited thereto.

Figure 9:
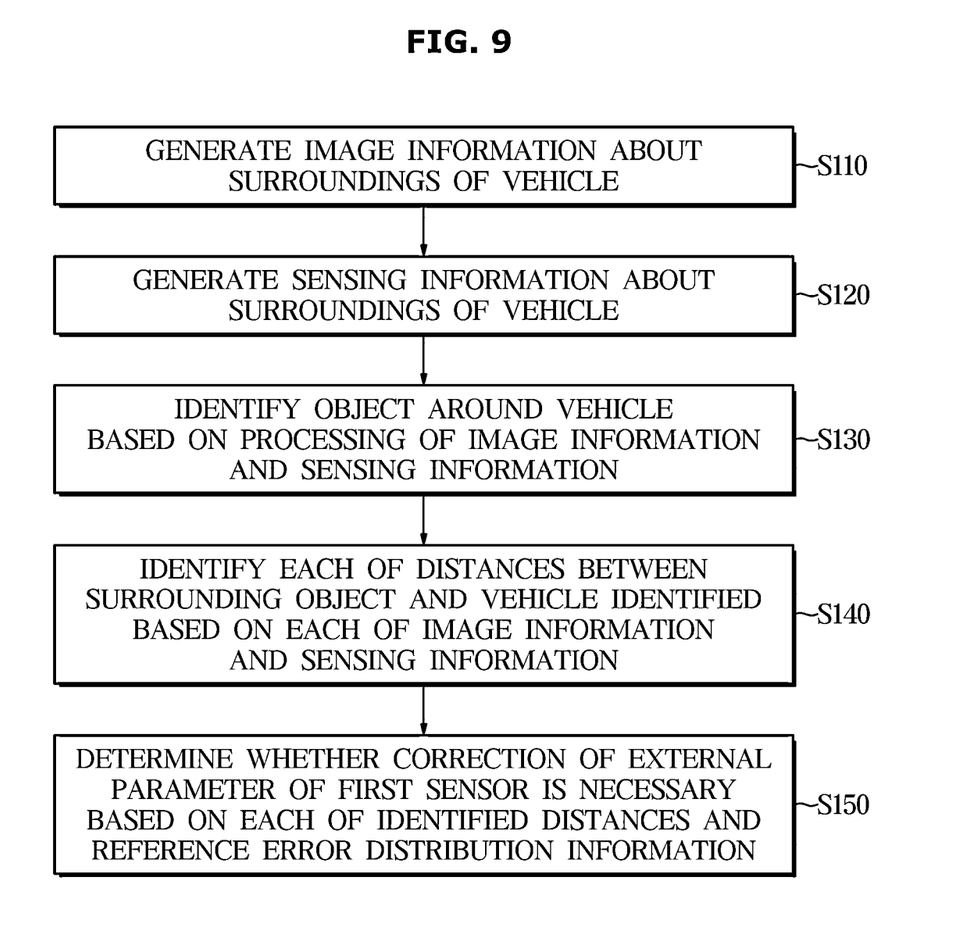
FIG. 9 is a flowchart for explaining a vehicle control method according to an embodiment.

FIG. 9 is a flowchart for explaining a vehicle control method according to an embodiment.

A vehicle 10 control method may be performed by the vehicle 10 described above. Accordingly, although omitted below, the above description of the vehicle 10 may be equally applied to description about the vehicle control method.

Referring to FIG. 9, the vehicle 10 may generate image information about the surroundings of the vehicle 10 (step S110).

The vehicle 10 may also generate sensing information about the surroundings of the vehicle 10 (step S120).

The vehicle 10 may also identify an object around the vehicle 10 based on the processing of the image information and the sensing information (step S130).

The vehicle 10 may also identify each of distances between the identified surrounding object and the vehicle 10 based on each of the image information and the sensing information (step S140).

The vehicle 10 may also determine whether correction of the external parameter of the first sensor 110 is necessary based on each of the identified distances and the reference error distribution information (step S150).

As should be apparent from the above, a vehicle and a control method thereof according to an embodiment of the present disclosure may provide an effect of securing reliability and stability with respect to a distance of a recognized object by determining the need for correcting an external parameter and correcting the external parameter of a camera when a physical shift in a mounting position and/or angle of the camera occurs.

The disclosed embodiments may be implemented in the form of a recording medium storing instructions executable by a computer. The instructions may be stored in the form of program code, and when executed by a processor, a program module may be created or configured to perform the operations of the disclosed embodiments. The recording medium may be implemented as a computer-readable recording medium.

The computer-readable recording medium includes any type of recording medium in which instructions readable by the computer are stored. For example, the recording medium may include a read only memory (ROM), a random access memory (RAM), a magnetic tape, a magnetic disk, a flash memory, an optical data storage device, and the like.

The embodiments disclosed with reference to the accompanying drawings have been described above. It should be understood by those of ordinary skill in the art that various changes in form and detail may be made to the disclosed embodiments without departing from the spirit and scope of the disclosure as defined by the appended claims. The disclosed embodiments are illustrative and should not be construed as limiting.

What is claimed is:

1. A vehicle comprising:
    a first sensor provided to have a field of view facing surroundings of the vehicle and to generate image information;
    a second sensor comprising at least one of a radar sensor or a lidar sensor and configured to generate sensing information about the surroundings of the vehicle; and
    a controller comprising a processor configured to process the image information and the sensing information and a memory configured to store reference error distribution information,
    wherein, in response to an optimal environment minimizing noise for identification of a first distance and lowering a sensitivity of the second sensor, the controller is configured to
        identify a first object around the vehicle based on the image information,
        identify a second object around the vehicle based on the sensing information,
        identify the first distance between the identified first object and the vehicle based on the image information,
        identify a second distance between the identified second object and the vehicle based on the sensing information,
        identify a distance error between the first distance and the second distance,
        determine whether correction of an external parameter of the first sensor is necessary based on the identified distance error and the reference error distribution information,
        identify a current environment as the optimal environment when a first number of objects identified based on the image information and a second number of objects identified based on the sensing information are the same.

2. The vehicle according to claim 1, wherein the controller is configured to identify the first object and the second object as a same object and to identify the distance error using the same object.

3. The vehicle according to claim 2, wherein the controller generates distance error distribution information based on the identified distance error based of the same object.

4. The vehicle according to claim 3, wherein the controller determines that correction of the external parameter of the first sensor is necessary when an average of the generated distance error distribution information exists outside a predetermined interval of the reference error distribution information.

5. The vehicle according to claim 3, wherein the controller determines that correction of the external parameter of the first sensor is necessary when a difference between a variance of the generated error distribution information and a variance of the reference error distribution information is greater than or equal to a predetermined value.

6. The vehicle according to claim 1, wherein the controller determines that correction of the external parameter of the first sensor is necessary when the identified distance exists outside a predetermined interval of the reference error distribution information.

7. The vehicle according to claim 6, wherein the controller generates a signal for controlling at least one of an audio device or a display device to output a warning message in response to determining that correction of the external parameter of the first sensor is necessary.

8. The vehicle according to claim 1, wherein
    the memory is further configured to store corrected external parameters respectively matched to a plurality of mounting positions and a plurality of angles of the first sensor, and
    the controller updates the external parameter of the first sensor based on the corrected external parameters in response to determining that correction of the external parameter of the first sensor is necessary.

9. The vehicle according to claim 8, wherein the controller generates a signal for controlling at least one of an audio device or a display device to output a warning message when there is no corrected external parameter including the identified distance among the corrected external parameters.

10. A vehicle control method comprising:
    generating, by a first sensor, image information about surroundings of a vehicle;
    generating, by a second sensor, sensing information about the surroundings of the vehicle;
    in response to an optimal environment minimizing noise for identification of a first distance and lowering a sensitivity of the second sensor, identifying, by a controller, a first object around the vehicle based on the image information;
    identifying, by the controller, a second object around the vehicle based on the sensing information;
    identifying, by the controller, the first distance between the identified first object and the vehicle based on the image information;
    identifying, by the controller, a second distance between the identified second object and the vehicle based on the sensing information;
    identifying, by the controller, a distance error between the first distance and the second distance; and
    determining, by the controller, whether correction of an external parameter of the first sensor is necessary based on the identified distance error and reference error distribution information stored in a memory,
    wherein the optimal environment is a current environment when a first number of objects identified based on the image information and a second number of objects identified based on the sensing information are the same,
    wherein the first sensor includes an image sensor, and
    wherein the second sensor includes at least one of a radar sensor or a lidar sensor.

11. The vehicle control method according to claim 10, further comprising:
    identifying the first object and the second object as a same object and identifying the distance error using the same object.

12. The vehicle control method according to claim 11, further comprising:

generating distance error distribution information based on the identified distance error based on the same object.

13. The vehicle control method according to claim 12, wherein the determining of whether correction of the external parameter of the image sensor is necessary comprises determining that correction of the external parameter of the image sensor is necessary when an average of the generated distance error distribution information exists outside a predetermined interval of the reference error distribution information.

14. The vehicle control method according to claim 10, wherein the determining of whether correction of the external parameter of the image sensor is necessary comprises determining that correction of the external parameter of the image sensor is necessary when the identified distance error exists outside a predetermined interval of the reference error distribution information.

15. The vehicle control method according to claim 14, further comprising:

generating a signal for controlling at least one of an audio device or a display device to output a warning message in response to determining that correction of the external parameter of the image sensor is necessary.

16. The vehicle control method according to claim 10, further comprising:

storing corrected external parameters respectively matched to a plurality of mounting positions and a plurality of angles of the image sensor; and updating the external parameter of the image sensor based on the corrected external parameters in response to determining that correction of the external parameter of the image sensor is necessary.

17. The vehicle control method according to claim 16, further comprising:

generating a signal for controlling at least one of an audio device or a display device to output a warning message when there is no corrected external parameter including the identified distance error among the corrected external parameters.

\* \* \* \* \*